US007145723B2

(12) United States Patent
Tompkin et al.

(10) Patent No.: US 7,145,723 B2
(45) Date of Patent: Dec. 5, 2006

(54) SECURITY ELEMENT

(75) Inventors: Wayne Robert Tompkin, Baden (CH); René Staub, Hagendorn (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 499 days.

(21) Appl. No.: 10/489,832

(22) PCT Filed: Sep. 4, 2002

(86) PCT No.: PCT/EP02/09861

§ 371 (c)(1), (2), (4) Date: Mar. 17, 2004

(87) PCT Pub. No.: WO03/033274

PCT Pub. Date: Apr. 24, 2003

(65) Prior Publication Data

US 2004/0239099 A1 Dec. 2, 2004

(30) Foreign Application Priority Data

Oct. 12, 2001 (DE) ................................ 101 50 293

(51) Int. Cl.
*G02B 27/00* (2006.01)

(52) U.S. Cl. ........................... 359/576; 359/569; 359/2

(58) Field of Classification Search ................ 359/576, 359/569, 572, 2, 566
See application file for complete search history.

(56) References Cited

U.S. PATENT DOCUMENTS

| | | | | |
|---|---|---|---|---|
| 4,568,141 A | | 2/1986 | Antes | |
| 4,856,857 A | | 8/1989 | Takeuchi et al. | |
| 4,984,824 A | | 1/1991 | Antes et al. | |
| 5,032,003 A | | 7/1991 | Antes | |
| 5,104,471 A | * | 4/1992 | Antes et al. | 156/233 |
| 5,737,886 A | | 4/1998 | Kruckemeyer | |
| 6,369,919 B1 | * | 4/2002 | Drinkwater et al. | 359/2 |
| 7,054,042 B1 | * | 5/2006 | Holmes et al. | 359/2 |
| 2005/0270604 A1 | * | 12/2005 | Drinkwater | 359/2 |

FOREIGN PATENT DOCUMENTS

| | | |
|---|---|---|
| DE | 44 10 431 A1 | 9/1995 |
| EP | 0 105 099 A1 | 4/1984 |
| EP | 0 330 738 A1 | 9/1989 |
| EP | 0 375 833 A1 | 7/1990 |

(Continued)

*Primary Examiner*—Fayez G. Assaf
(74) *Attorney, Agent, or Firm*—Hoffmann & Baron, LLP

(57) ABSTRACT

A security element (2) in the form of a laminate can be used for the authentication of a document (1). The laminate has at least a transparent protective layer, a transparent lacquer layer and an adhesive layer, the lacquer layer being arranged between the protective layer and the adhesive layer. An interface in the form of a reflection layer separates the adhesive layer and the lacquer layer. The interface is divided into regions of a pattern (25) with flat surface portions and with relief structures which are formed in the lacquer layer. The flat surface portions form background surfaces (3) providing flat mirror surfaces for light which is incident into the laminate, while the regions with the relief structures of a predetermined, optically effective structure depth form pattern elements (4). The relief structures of the pattern elements (4) absorb the incident light. In the reflected light of the reflecting background surfaces (3) the dark pattern elements (4) form a strong contrast and the pattern (25) is clearly visible. In directions other than that of the reflected light the contrast between the background surfaces (3) and the pattern elements (4) disappears so that a copier apparatus reproduces the background surfaces (3) and the pattern elements (4) as black surfaces.

13 Claims, 4 Drawing Sheets

FOREIGN PATENT DOCUMENTS

| | | |
|---|---|---|
| EP | 0 401 466 A1 | 12/1990 |
| EP | 0 522 217 B1 | 1/1993 |
| GB | 2 129 739 | 5/1984 |

* cited by examiner

Fig. 7a
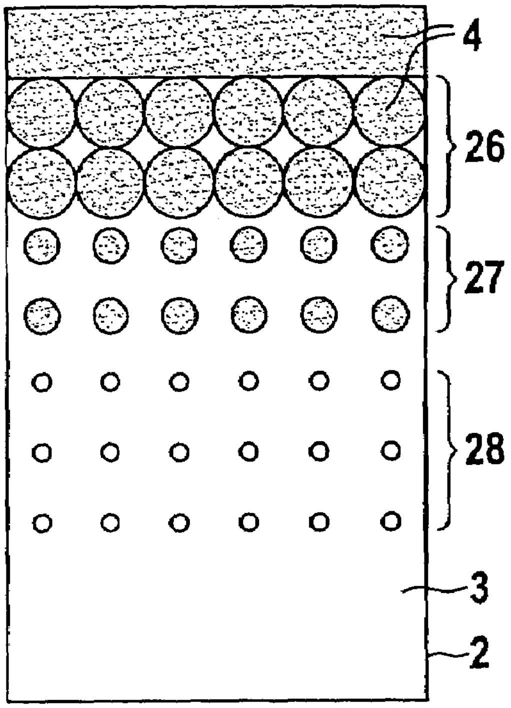
Fig. 7b
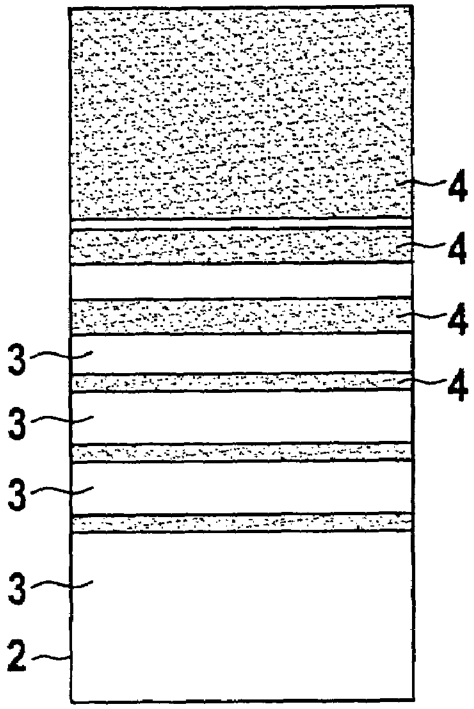
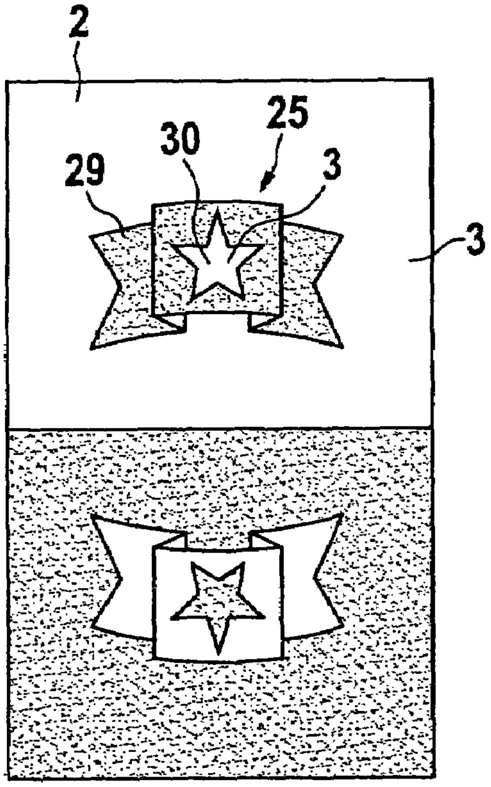
Fig. 8

SECURITY ELEMENT

This application claims priority based on an International Application filed under the Patent Cooperation Treaty, PCT/EP02/09861, filed on Sep. 4, 2002, and German Patent Application No. 101 50 293.1, filed on Oct. 12, 2001, both of which are incorporated herein by reference in their entirety.

BACKGROUND OF THE INVENTION

The invention relates to an optically diffractive security element, as set forth in the classifying portion of claim 1.

Such security elements are used for the authentication of documents such as value-bearing papers or bonds, cheques, banknotes, credit cards, passes and identity cards of all kinds, entrance tickets, driving licences and so forth, the security element being for example in the form of a thin layer composite or laminate, which is fixed on the document by adhesive.

Modern copiers for coloured copies represent a serious potential danger for documents which are produced by a printing procedure, because the visual differences between the original and the copy are so slight that only an expert equipped with the appropriate aids can distinguish the original from the copy, in which respect it is often necessary to refer to other criteria such as intaglio printing, a watermark, fluorescence, optically variable security elements with diffraction structures and so forth, apart from the appearance of the printed image.

It is known from EP 0 522 217 B1 that reflective foil portions arranged on a document implement good protection against unauthorised copying of such documents. The difference between the original with the reflective foil portions and a copy can be clearly seen as the copying machines reproduce reflective surfaces as black. It will be appreciated however that reflective foils are readily available on the market. The black surfaces in such copies can therefore easily have reflective foil stuck over them, in order to make the copy appear more genuine.

DE 44 10 431 A1 describes further developments of the above-described foil portions. The security element is a foil portion which is cut from a laminate, with a flat, mirroring reflection layer. The reflection layer is removed in surface portions which form an individual identification on the surface of the foil portion, so that a black layer arranged under the reflection layer becomes visible. On the copy produced by the copier machine, the black identification disappears in the reproduction of the remaining mirror surface, as the surface portions in which the reflection layer is removed and the mirror surface which has remained behind in the copy appear uniformly black. Another security element, instead of the flat mirror surfaces, has a hologram structure with the identification and, in the copying procedure, behaves like the diffraction structures which are discussed in the next paragraph. In the copy therefore, the identification can be detected in the copied image of the hologram.

It is also known for example from GB 2 129 739 B for valuable documents to be provided with an optically variable security element having diffraction structures (for example holograms, mosaic-like surface patterns comprising diffractive surface elements, for example in accordance with EP 0 105 099 A1, EP 0 330 738 A1, EP 0 375 833 A1, and so forth). Those security elements have a pattern or image which changes in dependence on the viewing condition. From the point of view of unauthorised persons, those security elements can be imitated only at high cost. Unfortunately, the colour copy of the document reproduces one of the patterns or images of the security element, which is visible in the original under the viewing condition which is fixed in the copier for the imaging procedure. It will be appreciated that it is no longer possible to see any change in the pattern or image in the copy, upon a variation in the viewing condition, but if the receiver is not paying attention, a copy can easily be considered to be the genuine document.

Embodiments of the laminate for the security elements and materials which can be used for that purpose are described in EP 0 401 46 A1 and U.S. Pat. No. 4,856,857.

SUMMARY OF THE INVENTION

The object of the present invention is to provide an inexpensive, optically variable security element which cannot be reproduced by a copier apparatus and which also cannot be copied with holographic methods.

In accordance with the invention that object is attained by the features recited in the characterising portion of claim 1. Advantageous configurations of the invention are set forth in the appendant claims.

BRIEF DESCRIPTION OF THE DRAWINGS

Embodiments of the invention are described in greater detail hereinafter and illustrated in the drawing in which:

FIGS. 7*a* and 7*b* show the security element with grey stages, and

FIG. 8 shows a relief structure.

DESCRIPTION OF THE PREFERRED EMBODIMENTS

Figure 1:
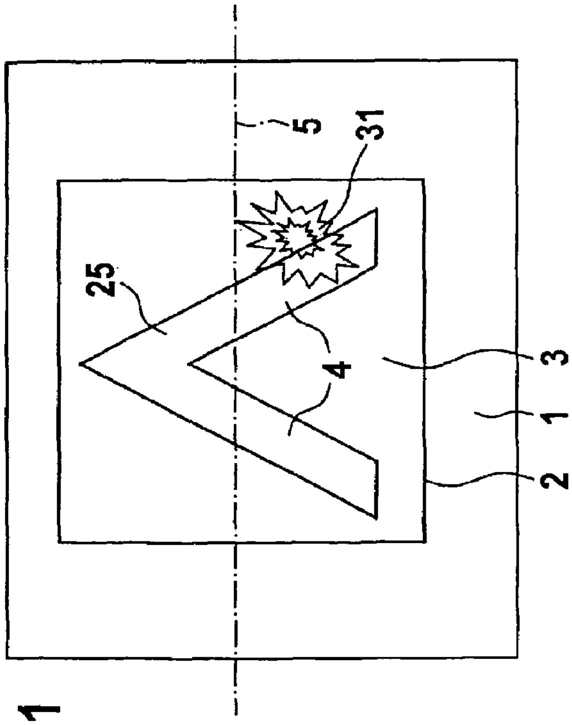
FIG. 1 shows a document.

Referring to FIG. 1, reference 1 denotes a document, 2 denotes a security element, 3 a background surface, 4 a pattern element and 5 a notional tilt axis which is in the plane of the document 1. The document 1 is illuminated using directed artificial light laterally and inclinedly from above and is viewed perpendicularly from above. The security element 2 is fixed on the document 1. For identification purposes, the security element 2 has a pattern 25 comprising the pattern elements 4 which are surrounded by the background surfaces 3. In order to make the drawing in FIG. 1 clearer, the pattern 25 comprises a single pattern element 4 and forms a simple "V" sign. A practical embodiment involves the arrangement of a plurality of the background surfaces 3 and the pattern elements 4, with respect to the pattern 25. Under the specified illumination and observation conditions, the pattern 25 is not visible to an observer as there is no contrast between the pattern element 4 and the background surface 3, and both surfaces, both the background surface 3 and also the pattern element 4, appear dark, for example metallically matt. In diffuse daylight or in diffuse room lighting in contrast and under certain illumination conditions which are set forth hereinafter, the pattern element 4 stands out as being dark, from the light background surface 3, and is therefore clearly visible to the observer.

Figure 2:
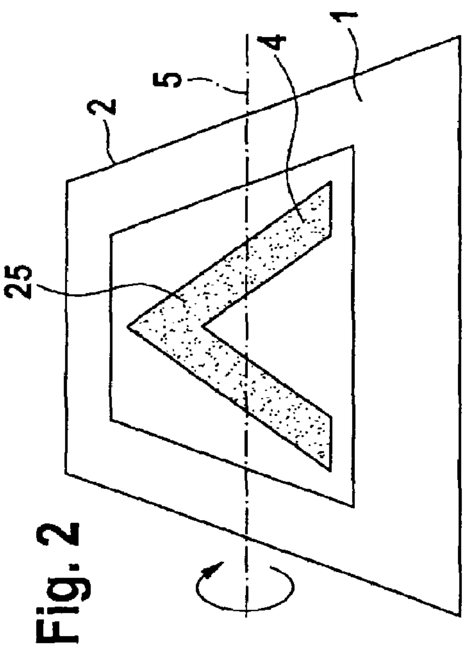
FIG. 2 shows the document when tilted about an axis.

If, as shown in FIG. 2, the document 1 with the security element 2 is tilted about the tilt axis 5 in such a way that the background surface 3 reflects light into the eye of the observer, then the observer can recognise the pattern 25 as the pattern element 4 remains dark and stands out from the background surface 3, with a high level of contrast. Under that observation condition, the reflection condition for the observer is fulfilled. Rotation of the security element 2 in its plane does not change the appearance of the pattern 25 in the reflection condition, from the point of view of the observer, that is to say azimuthal orientation of the security element 2 is not to be implemented.

Figure 3:
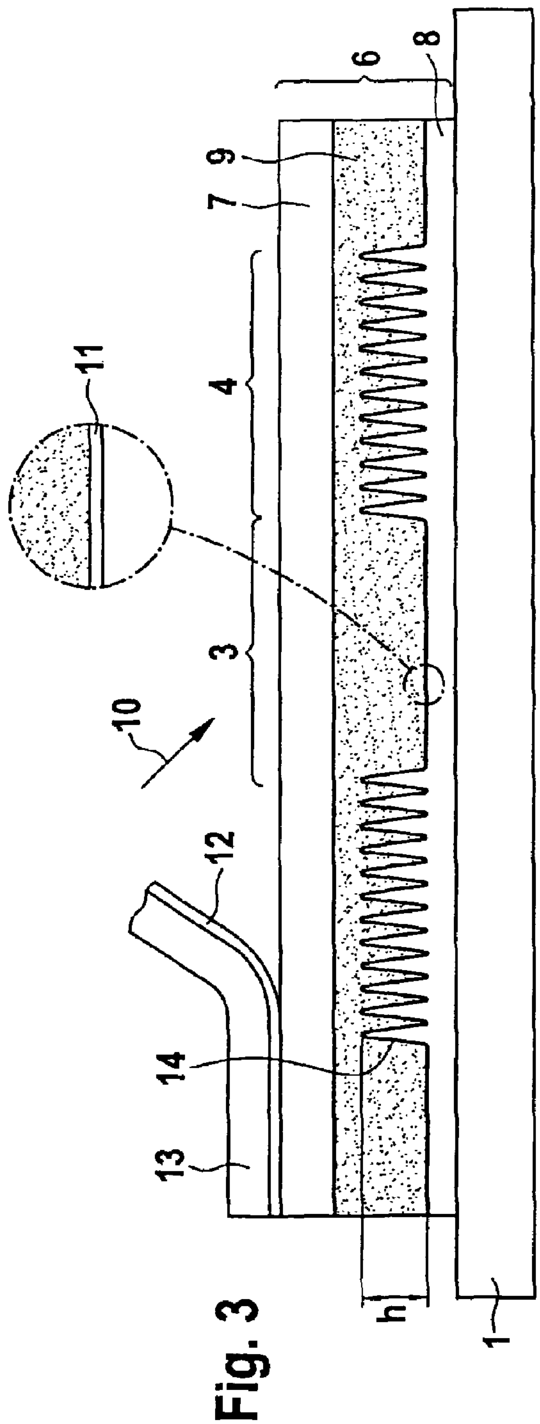
FIG. 3 shows a view in cross-section of a security element.

FIG. 3 shows the security element 2 (FIG. 2) in cross-section, wherein the section plane contains for example the tilt axis 5 (FIG. 2). The security element 2 comprises a layer composite or laminate 6 comprising a plurality of layers 7, 8, 9 and 11. Examples in regard to the structure of the laminate 6 and the materials used for same are to be found in EP 0 401 466 A1 and U.S. Pat. No. 4,856,857.

In the simplest case the laminate 6 includes at least a protective layer 7, an adhesive layer 8 and a lacquer layer 9 arranged between the protective layer 7 and the adhesive layer 8. The adhesive layer 8 joins the security element 2 to the document 1. An interface between the adhesive layer 8 and the lacquer layer 9 reflects light 10 which is incident through the cover layer 7 and the lacquer layer 9 if the refractive index at the boundary layer suddenly changes at the transition from the lacquer layer 9 to the adhesive layer 8. With the materials in Table 6 of U.S. Pat. No. 4, 856,857 the difference in the refractive indices is too small to achieve a strong reflection. The reflection capability is therefore increased by a reflection layer 11 which is arranged at the interface and which is a thin layer (<0.4 micrometer) comprising a metal or a metal coated with a suitable inorganic dielectric layer, the dielectric layer being arranged on the side of the metal, that is towards the incident light 10.

The materials for the reflection layer 11 are contained Table 1 to 5 of U.S. Pat. No. 4,856,857; Tables 1 to 6 are expressly incorporated into this description. Tellurium which is not mentioned in Table 5 is also suitable for the reflection layer 11. The incident light 10 means daylight or visually visible polychromatic light of wavelengths of between 380 nm and 780 nm.

In another embodiment of the laminate 6 the surface of the cover layer 7 of the laminate 6; that is remote from the lacquer layer 9, is connected to a carrier band or strip 13 by means of a separating layer 12 in order to facilitate transfer of the fragile laminate 6 onto the document 1. The carrier band 13 of paper or a plastic foil, for example PC or PETP can be removed after the laminate 6 has been glued in place so that the pattern 25 (FIG. 2) is visible through the protective layer 7 and the lacquer layer 9. In that respect attention is directed to GB 2 129 739 B which has already been referred to above.

As can be seen from FIG. 3 a relief structure 14 with a geometrical profile depth p is formed into the lacquer layer 9, in the region of the pattern elements 4. In the region of the background surfaces 3 the lacquer layer 9 is formed smooth and flat and is parallel to the other layers of the laminate 6. The material of the adhesive layer 8 fills the depressions of the relief structure 14. The interface with or without the additional reflection layer 11 follows both the relief structure 14 and also mirror planes of the background surfaces 3.

The relief structure 14 is a cross grating comprising two base gratings of periods d smaller than a limit wavelength λ at the short-wave end in the spectrum of visible light, that is to say between λ=380 nm and λ=420 nm and has an optically effective structure depth h, that is the profile depth p multiplied by the refractive index of the lacquer layer 9, preferably in the range of between h=50 nm and h=500 nm. Such relief structures 14 absorb almost all visible light 10 which is incident on the pattern elements 4 and scatter a small fraction of the incident light 10 back into the half-space above the pattern element 4. The percentage of the absorbed light 10 is non-linearly dependent on the structure depth h and can be controlled by means of the choice of the structure depth h in the above-mentioned range of between 50% and about 99%, in which respect the shallower the relief structure 14 the correspondingly more incident light 10 is scattered back and the correspondingly less light 10 is absorbed. The specified percentages apply for the relief structure 14 with a reflection layer 11 of for example aluminium. Adjoining regions of the pattern elements 4 with various structure depths h therefore exhibit a grey gradua-tion.

Figure 4:
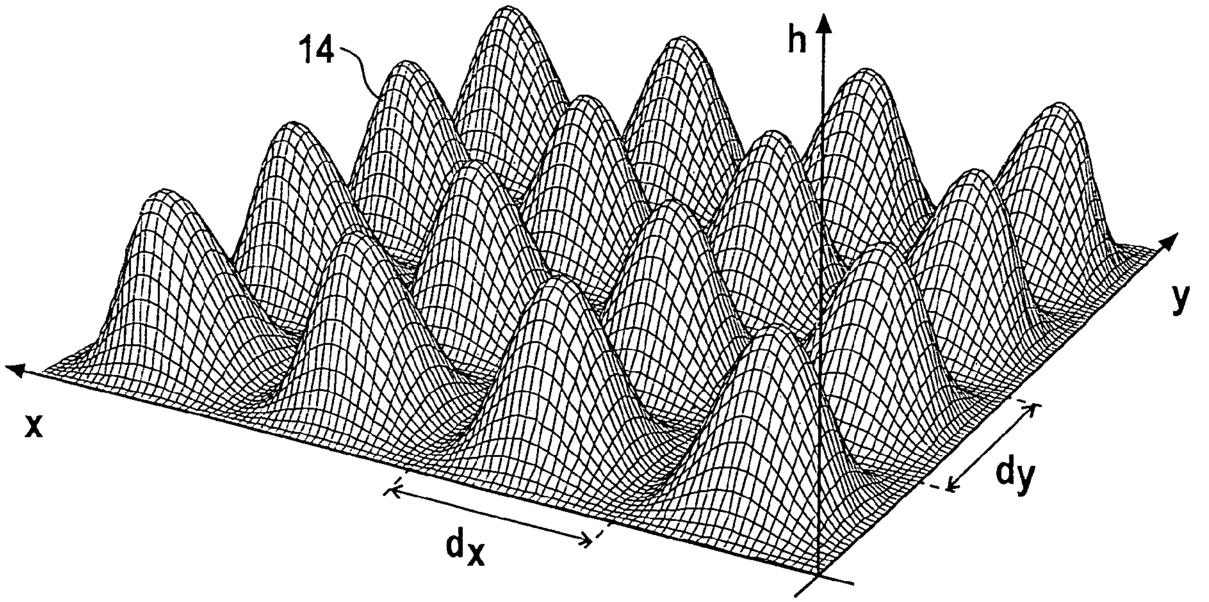
FIG. 4 shows the interface of a relief structure.

The embodiment of the relief structure 14 which is shown in FIG. 4 is a cross grating formed by two sinusoidal base gratings which cross at a right angle. The sine function of the first base grating, which extends along the co-ordinate x, is of a period $d_x$ and an amplitude $h_x$ while the sine function of the second base grating which extends along the co-ordinate y is of a period $d_y$ and an amplitude $h_y$. Over the plane defined by the co-ordinates x and y the interface h(x, y) formed by the cross grating in the laminate 6 (FIG. 3) follows for example the function:

$$h(x,y)=[h_x+h_y]\cdot\sin^2(\pi x/d_x)\cdot\sin^2(\pi y/d_y).$$

Other embodiments involve $h(x, y)=h_x\cdot\sin^2(\pi x/d_x)+h_y\cdot\sin^2(\pi y/d_y)$, with rectangular or pyramid structures being used as the interface h(x, y).

In an embodiment the two periods $d_x$, $d_y$ and the structure depths $h_x$, $h_y$ are the same, while in other embodiments they are different. The structure depth $h=[h_x+h_y]$ can be selected to be greater than the period d, but the relief structure 14 is difficult to produce, with the present-day manufacturing methods. The interface h(x, y) is like an egg carton and is shown in FIG. 4.

Figure 5:
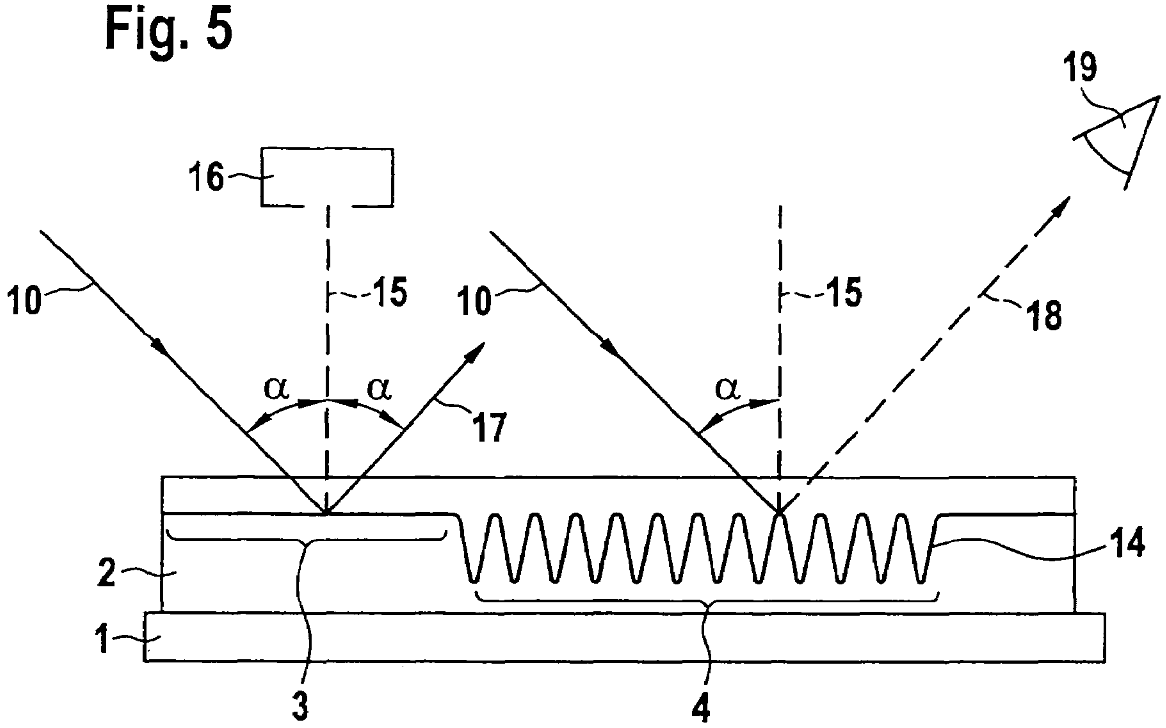
FIG. 5 shows a first observation condition.

Referring to FIG. 5, the optical behaviour of the security element 2 with a first observation direction will now be discussed. The incident light 10 forms an angle of about 40° with the normal 15 to the plane of the security element 2. In an example the pattern elements 4 with the above-described relief structure 14 absorb in the visible range up to 95% of the incident light 10, the remainder is scattered. The reflective background surface 3 in contrast absorbs only about 10% of the incident light 10 and reflects the rest. As surface portions of the pattern elements 4 adjoin the reflective background surfaces 3, the observer therefore has such a strong contrast that the pattern elements 4 arranged on a predetermined background surface 3 of the security element 2 in the predetermined pattern 25 can be easily recognised as information. The pattern 25 represents a logo, a text, an image or another graphic character.

The drawing in FIG. 5 corresponds to the illumination conditions in the copier apparatus. Depending on the respective model of the copier apparatus, the directed light 10 of the copier apparatus which is incident on the document 1 and the security element 2, forms the angle of incidence α in the range of about 40° to 50° to the normal 15. The document 1 scatters the incident light 10 into the entire half-space. As a result scattered light passes into a light receiver 16 of the copier apparatus, which is arranged in the direction of the normal 15. In contrast thereto the light 17 which is reflected from the background surface 3 is deflected at the same angle α in accordance with the law of reflection into a viewing direction 18 of the observer 19 and does not pass into the light receiver 16. If the light 10 is incident on the pattern element 4 at the same angle of incidence α, the incident light 10 in contrast is practically absorbed; both the light receiver 16 and also the observer 19 register no light from the pattern element 4. The pattern element 4 is therefore dark.

The background surfaces 3 form the flat mirror surfaces of the pattern 25, for the light 10 which is incident in the laminate 6, while the pattern elements 4 as absorber surfaces swallow up the major part of the incident light 10. Therefore, in the reflected light 17, the observer 19 recognises the background surfaces 3 in the form of intensively light surface portions and the pattern elements 4 as dark surface portions of the pattern 25. In directions other than that of the reflected light 17, the security element 2 scatters only a small part of the incident light 10. The levels of intensity per unit of surface area of the light which is scattered at the background surfaces 3 and the pattern elements 4 are practically of the same magnitude so that there is no contrast between the background surfaces 3 and the pattern elements 4. In the case of illumination with the directedly incident light 10, the pattern 25 formed from the background surfaces 3 and the pattern elements 4 is recognisable only in the light 17 reflected with specular reflection, in contrast to a black-and-white image which is produced by a printing procedure.

In the copier apparatus the background surface 3 and the pattern element 4 projects such a small projection of the incident light 10 into the light receiver 16 that the copier apparatus indiscriminately reproduces the background field 3 and the pattern element 4 as black surfaces. The advantage of this security element 2 is that the copier apparatus cannot reproduce the information represented by the pattern element 4 while the observer 9 who, when using directedly incident light 10, almost automatically tilts the security element 2 in such a way that he views the background surface 3 in a reflection mode, can see the information of the pattern element 4 with a high level of contrast against the background surface 3. In that way the security element 2 can be easily distinguished by an attentive observer from reflecting metal foils on good coloured copies of the document 1. A further advantage is formed by the use of the relief structure 14 in the security element 2 with the periods $d_x$ (FIG. 4) and $d_y$ (FIG. 4) which are shorter than the wavelengths of the coherent light sources which can be used for holographic copying methods; it is therefore not possible to produce a copy of the security element 2 with the holographic methods.

Figure 6:
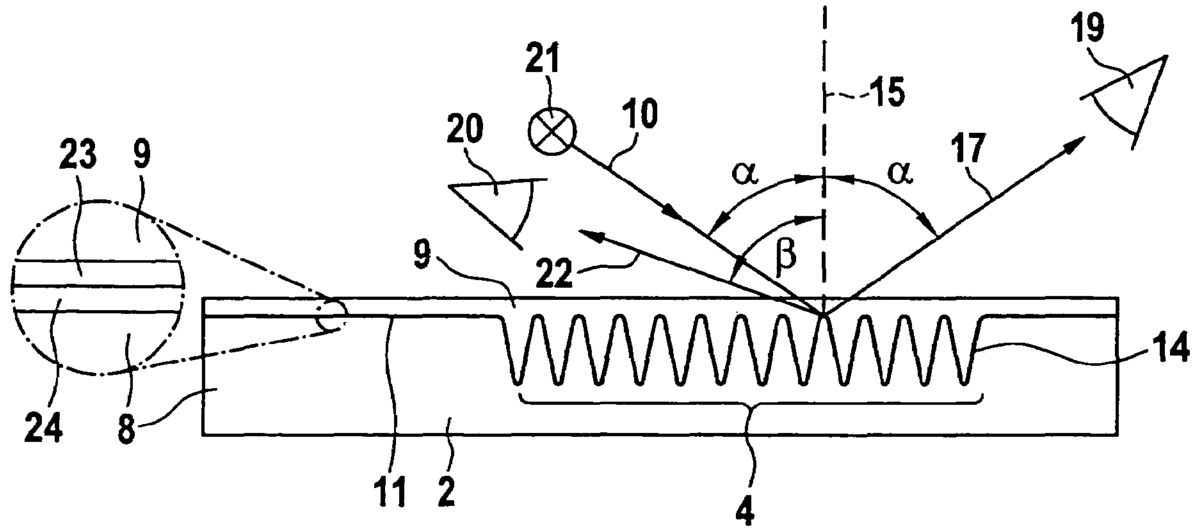
FIG. 6 shows a second observation condition.

FIG. 6 shows a second illumination condition for the two observers 19, 20 of the security element 2. A polychromatic radiation source 21, for example a halogen lamp, an incandescent lamp and so forth, is arranged above the second observer 20 and emits the incident light 10 onto the pattern element 4 at a large angle of incidence α of about 60° to 80°. The first observer 19 sees the pattern 25 (FIG. 2) of the pattern elements 4 in front of the background 3 (FIG. 5) at the reflection angle α, as referred to above. If the periods $d_x$ (FIG. 4), $d_y$ (FIG. 4) of the relief structure 14 are in the region of a half and whole limit wavelength λ; that is to say $\lambda \geqq d \geqq \lambda/2$, wherein $d=d_x$ or $d_y$ respectively, a part of the incident light 10 is deflected at a large diffraction angle β into the minus first order, as diffracted light 22. The second observer 20 can recognise the diffracted light 22. The diffracted light 22 includes the short-wave portion of the visually visible spectrum of the electromagnetic radiation. The diffracted light 22 is therefore dependent on the diffraction angle β and the periods $d_x$, $d_y$ in a blue-green to violet colour. The colour of the diffracted light 22, which is observed at a predetermined diffraction angle β relative to the normal 15, is also dependent on the azimuth, in respect of its intensity. Note: in the foregoing consideration the refractive influence of the protective layer 7 has been disregarded.

In contrast, the first observer 19 is looking in the direction of the reflected light 17 and sees the background surfaces 3 as shinily bright surface portions and the pattern elements 4 as dark surface portions of the pattern 25.

If the period $d_x$ or $d_y$ is less than λ/2, the diffracted light 22 can no longer be seen by the second observer 20, in the direction of the co-ordinate x or y respectively, as the relief structure 14 no longer diffracts visible light 22. The first observer 19 who is observing the security element 2 at the reflection angle α sees the pattern elements 4 unchanged in a dark-brown to black colour, under these conditions.

The colour of the pattern elements 3 which are visible at the reflection angle α depends on the nature of the reflection layer 11 as various combinations of the materials in and at the reflection layer 11 do not uniformly reflect the incident light 10 in the entire spectral range of the visible electromagnetic radiation. Deep-black pattern elements 3 advantageously have a gradual transition in respect of the refractive index from the lacquer layer 9 to the reflection layer 11; the transition is produced by means of at least one layer of an inorganic dielectric 23 between the lacquer layer 9 and a metal layer 24 of the reflection layer 11. For the flat mirror surface of the background surfaces 3, the reflection layer 11 formed from the dielectric 23 and the metal layer 24 does not have a noticeable effect. In the case of the relief structure 14 in contrast, that reflection layer 11, as a consequence of interference phenomena, causes almost complete extinction of the incident light 10, which occurs in particular uniformly over the entire spectral range of the visible electromagnetic radiation. An example has a 50 nm thick layer of the dielectric 23 of ZnS and 100 nm of aluminium as the metal layer 24. A further advantage is the structure depth h which is increased by the high refractive index for ZnS of n=2.4, in relation to the refractive index of the lacquer layer 9 of n=1.5, with the profile depth p of the relief structure 14 remaining the same.

Besides the grey graduations with pattern elements 4 with different structure depths h the grey graduation in an embodiment of the security element 2 is produced by means of rastering of varying density, with raster dots of less than 0.4 nm in dimension. In that respect it is immaterial whether the raster dots are arranged as the background field 3 in a pattern element 4 or as the pattern element 4 in the background field 3.

FIGS. 7*a* and 7*b* show further examples for the production of grey stages or steps within a security element 2 from the dark pattern element 4 to the brightly shining background field 3. FIG. 7*a* involves using raster dots of various sizes in a fixed raster of a maximum 0.5 mm spacing, corresponding to the grey stage. In a slightly lightened zone 26 the raster dots touch, in a lightened zone 27 the raster dots are of a mean dimension of about 0.25 mm while in a slightly darkened zone 28 the raster dots are about 0.15 mm. In FIG. 7*b*, instead of the dot raster, there is a line raster with a maximum 0.5 mm spacing. A corresponding line width here affords the grey graduation in the zones 26 (FIG. 7*a*) to 28 (FIG. 7*a*).

In one of the zones 26 to 28 the raster dots of the pattern surfaces 4 are of the same dimensions. A very fine grey graduation is achieved by means of the suitably stepped structure depths h in the relief structures 14 (FIG. 6), which is adequate for the reproduction of a black-and-white photograph.

FIG. 8 shows two patterns 25 of the security element 2 as a simple example. In the upper half of the security element 2 the pattern 25 comprises a band 29 with a star 30. The band 29 is formed from the dark pattern element 4. The area around the band 29 and the star 30 form the light background surfaces 3. Without limitation in respect of the foregoing description, the background surfaces 3 and the pattern elements 4 are interchangeable, as is shown in the lower half of the security element 2.

The security element 2 in FIG. 1 will be still more difficult to counterfeit if the pattern 25 forms a background for a mosaic surface pattern 31 with diffraction structures who spatial frequencies are of values in the range of 300 lines per mm to 2000 lines per mm. Such mosaic surface patterns 31 are known from above-mentioned EP 0 105 099 A1, EP 0 330 738 A1 and EP 0 375 833 A1. The content of those patent specifications is hereby incorporated into this description.

The invention claimed is:

1. A security element with a pattern comprising surface portions and in the form of a laminate for authentication of a document, which includes at least a transparent protective layer, a transparent lacquer layer and an adhesive layer, wherein the lacquer layer is arranged between the protective layer and the adhesive layer and the refractive index abruptly changes at the interface between the adhesive layer and the lacquer layer and the surface portions of the pattern are composed of background surfaces and pattern elements, wherein in the region of the background surfaces the lacquer layer is smooth and flat in form and in the region of the pattern elements relief structures with a predetermined, optically effective structure depth are formed into the lacquer layer, the background surfaces are flat mirror surfaces for light incident into the laminate, and the relief structures are cross gratings formed from base gratings with periods and the periods are shorter than a predetermined limit wavelength at the short-wave end in the spectrum of visible light so that the pattern elements absorb and scatter the incident light, wherein in each relief structure the ratio of the absorbed and the scattered light is predeterminedly dependent on the optically effective structure depth prevailing in the relief structure.

2. A security element according to claim 1, wherein the cross grating of the relief structure is composed of two base gratings with the periods which are arranged substantially at a right angle relative to each other.

3. A security element according to claim 1, wherein the base gratings are sinusoidal.

4. A security element according to claim 1, wherein at least one of the periods is longer than half the limit wavelength but shorter than the limit wavelength.

5. A security element according to claim 1, wherein the limit wavelength is selected to be in the range of between 380 nm and 420 nm.

6. A security element according to claim 1, wherein the periods of the two base gratings are of the same value.

7. A security element according to claim 1, wherein the values for the optically effective structure depth of the relief structures are selected to be in the range of 50 nm to 500 nm.

8. A security element according to claim 1, wherein the reflection layer contains a metal from the group consisting of aluminum, silver, gold, chromium, copper, nickel and tellurium.

9. A security element according to claim 8, wherein the reflection layer, on the side of the metal layer that is towards the lacquer layer, has at least one layer of an inorganic dielectric.

10. A security element according to claim 9, wherein the layer of the inorganic dielectric comprises ZnS and the metal layer comprises aluminum.

11. A security element according to claim 1, wherein the pattern has zones with grey stages and that the pattern elements of the zones with various grey stages differ by the optically effective structure depth of the relief structures.

12. A security element according to claim 1, wherein the pattern has zones with grey stages, that the pattern elements have identical values with respect of to the optically effective structure depth and that the zones differ by rastering of varying density of raster dots of dimensions of less than 0.4 mm.

13. A security element according to claim 1, wherein the pattern forms a background for a mosaic surface pattern comprising diffraction structures with spatial frequencies in the range of 300 lines per mm to 2000 lines per mm.

* * * * *

UNITED STATES PATENT AND TRADEMARK OFFICE

CERTIFICATE OF CORRECTION

PATENT NO. : 7,145,723 B2
APPLICATION NO. : 10/489832
DATED : December 5, 2006
INVENTOR(S) : Tompkin et al.

It is certified that error appears in the above-identified patent and that said Letters Patent is hereby corrected as shown below:

IN THE SPECIFICATION:

Column 8, line 38, now reads: "have identical values respect of to the optically effect-"

should read: --have identical values with respect to the optically effect- --

Signed and Sealed this

Third Day of April, 2007

JON W. DUDAS
*Director of the United States Patent and Trademark Office*